Patented Nov. 24, 1931

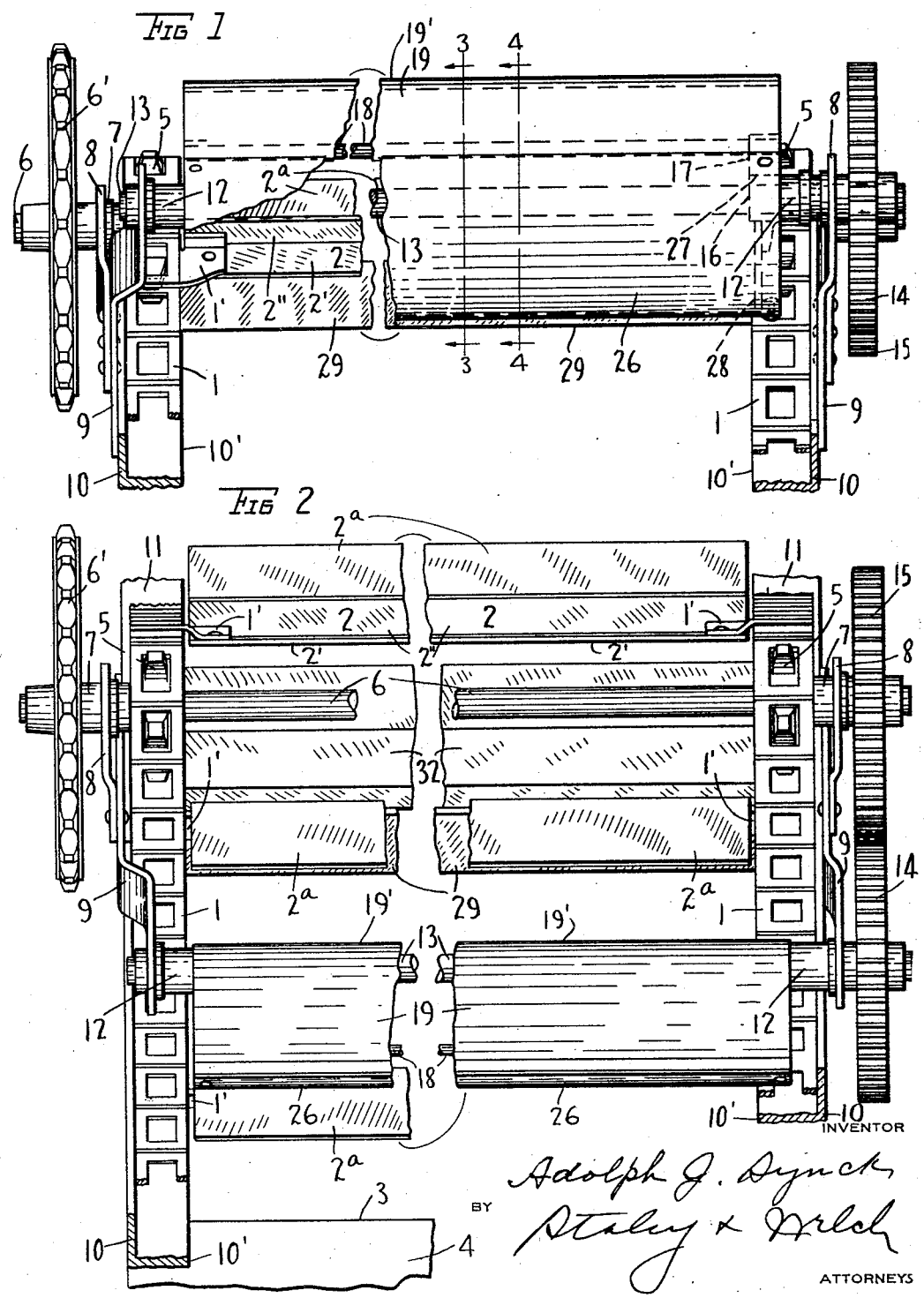
Nov. 24, 1931.  A. J. SYNCK  1,833,138
CORN PICKING MACHINE
Filed June 19, 1931  2 Sheets-Sheet 1

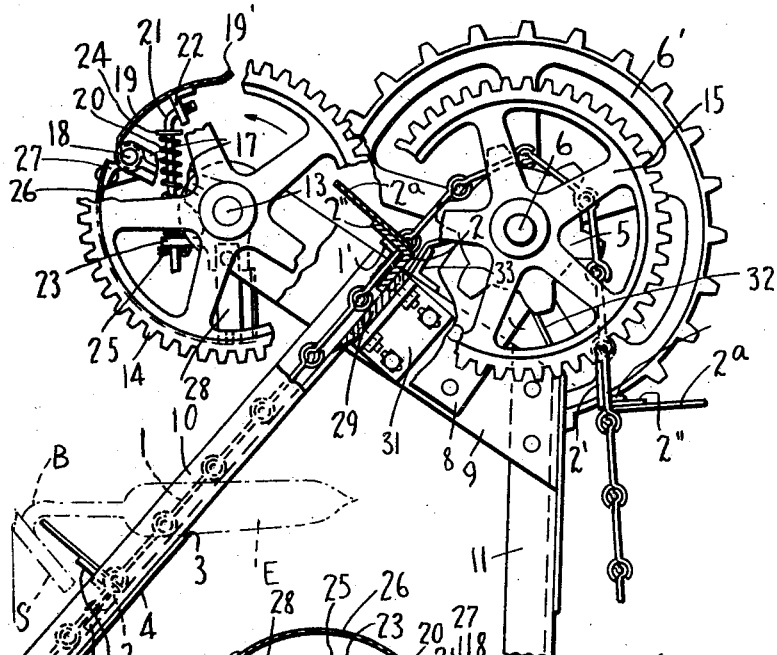
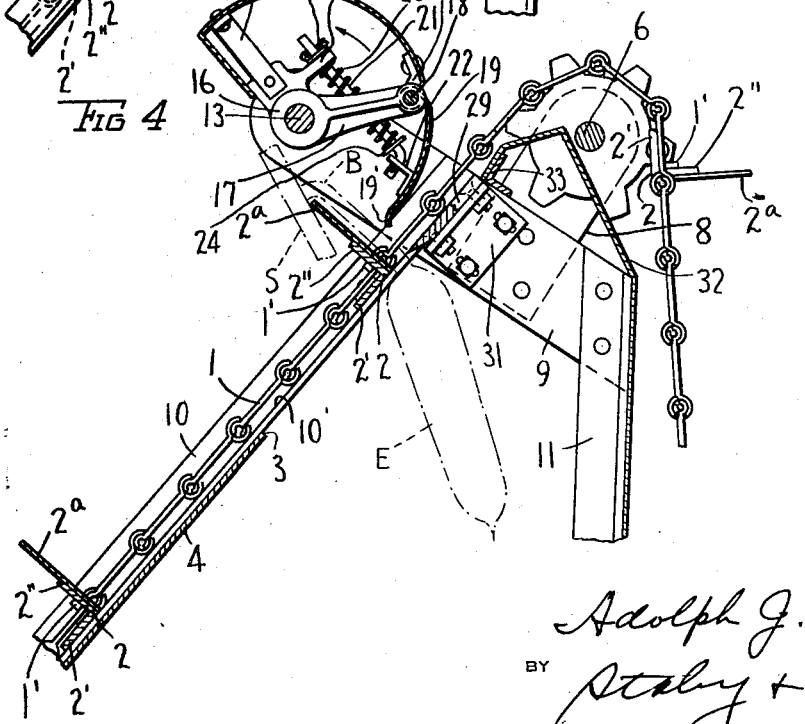

1,833,138

UNITED STATES PATENT OFFICE

ADOLPH J. SYNCK, OF COLDWATER, OHIO, ASSIGNOR TO THE NEW IDEA SPREADER COMPANY, OF COLDWATER, OHIO, A CORPORATION OF OHIO

CORN PICKING MACHINE

Application filed June 19, 1931. Serial No. 545,527.

This invention relates to corn picking machines, it more particularly relating to auxiliary mechanism for separating the ears from the stalks.

In certain weather and crop conditions the operation of a corn picker in the field is accompanied by a considerable amount of stalk breakage, the stalks being broken in various lengths. Regardless of the length, those portions of stalks having no ears attached thereon cause little or no trouble, being readily discharged to the ground by the normal operation of the snapping rolls. Occasionally, however, the action of the snapping rolls is not to snap the ear from the stalk but to merely cause the discharge into the elevator of an ear still attached to a section of broken stalk. It is the latter contingency that causes either a hampering of the operation of the picker or additional labor in gathering such ears from the ground, as almost invariably such ears are engaged by the elevator in a manner that prevents their dropping into the chute leading to the husking rolls, being carried over the chute and dropped to the ground at the rear of the machine.

The object of this invention is to provide simple and effective mechanism for separating the ears from such stalks as are discharged into the elevator in a way which will cause the ears to be properly fed to the chute leading to the husking rolls and the stalks to be discharged to the ground.

In the accompanying drawings:

Fig. 1 is a partial front elevation of the improved device, with some of the parts broken away.

Fig. 2 is a partial top plan view of the same.

Fig. 3 is a fragmentary transverse section, partly in side elevation, the section being taken on the line 3—3 of Fig. 1.

Fig. 4 is a fragmentary transverse section on the line 4—4 of Fig. 1, the view showing some of the parts in a different working position.

In corn picking machines there is provided snapping and gathering mechanism at the forward end of the machine which gathers the stalks, snaps the ears therefrom and deposits the ears upon an endless conveyor which carries the ears to a suitable point of discharge, which in the case of a machine which has husking rolls is a chute which leads to such rolls. In the present case the initial gathering devices and snapping rolls have not been shown, but a portion of the endless conveyor which receives the ears therefrom and with which my improvements cooperate has been illustrated.

Referring to the drawings, this endless conveyor consists of a pair of sprocket chains 1 1 which are connected by a plurality of spaced cross members in the nature of angle bars 2 to one wing 2'' of each of which is attached a slat $2^a$, the other wings 2'' of the angle members being secured to projecting tabs 1' on the chains. In the present case the conveyor is one designed for a two-row corn picker, being centrally positioned between the two pairs of gathering and snapping devices, but the improvements are equally applicable to a conveyor for a one-row machine. Beneath the cross members is a sheet metal floor 4 and the ears snapped from the stalks and carried upwardly by the cross members are discharged over the edge 3 of the floor, the ears falling into a chute leading to the husking rolls, neither the chute nor the husking rolls being shown in the present case. The sprocket chains of the conveyor pass over sprockets 5 on a horizontally-arranged shaft 6 supported in bearings 7, the bearings being secured to flat bars 8 attached to diagonally-disposed members 9. The members 9 tie together inclined angle-section members 10, which serve as tracks on which the chains run and also serve as a support for the floor 4, and also secure together the vertical supporting members 11 which are supported from the main frame of the machine (not shown). The conveyor after passing over the sprocket wheels turns downwardly and passes about idle sprockets (not shown) at the lower end of the run thereof. The conveyor is driven by power applied to the sprocket wheel 6' on the shaft 6.

In the forward upper ends of the members 9, which are spaced apart in parallel relation to each other on either side of the conveyor, are bearings 12 in which is rotatably mounted a shaft 13 which receives motion from the shaft 6 by spur gears 14 and 15. On the shaft 13 is mounted a pair of castings 16 each of said castings being located near one of the bearings. These castings have arms 17 extending radially through which at the outer extremity is passed a rod 18, and around this rod between the arms 17 is curled one edge of a curved sheet metal presser member 19 in the manner of a hinge. The presser member is spring-pressed outwardly in normally concentric relation with the shaft 13 by springs 20 each arranged on a bent rod 21 one end of which is hooked into an ear 22 attached to the under side of the presser member 19, while the other end of the rod passes through an outstanding ear 23 inwardly attached to the casting 16. Each spring is interposed between its ear 23 and a washer 24 secured to the rod 21 near the bent end thereof. The springs exert themselves to force the member 19 outwardly, which movement is limited by the cotter pins 25 inserted crosswise through the rods at the proper distance from the ends thereof on the opposite sides of the ears 23 from the springs.

The ratio of the spur gearing which drives the shaft 13 is such that said shaft makes one revolution for every space between the cross members of the conveyor, and the timing is so arranged that the trailing edge 19' of the presser member 19 during a revolution of the shaft will just clear the upper advancing edge and side of each slat 2a, as the same approaches the sprockets 5, and while in the position shown in Fig. 4 said edge 19' and the slats are both travelling for the moment at the same approximate speed. The purpose of the presser member is to press and turn the ears carried by the conveyor in a downwardly hanging position such as shown in Fig. 4, the presser member acting upon the ears with a yielding movement so that it may yield if necessary; subsequent movements of the slats and the edge 19' serving to tightly momentarily retain the ears in such position. The pressing down of the ears is also aided by a curved sheet metal member 26 rotating with the shaft 13; one end of this member being attached to ears 27 projecting from the leading sides of the arm 17 while the other end is shown as supported at the other end of strap arms 28 suitably positioned an angular distance from the arm 17 to provide an early engagement with all ears that fail to drop over the edge 3 of the floor.

At this point it should be explained that as a growing ear of corn increases in weight it hangs downwardly thereby causing the stem to bend, as indicated at B in Fig. 3 in which E and S represent the ear and stalk respectively, and a major portion of the picking of the corn crop is done on corn having such downwardly hanging ears, the stems of which have hardened and the bends therein take a permanent set during maturity. It has been noted from observation in the field that of the broken stalks having ears attached which are carried by the conveyor, a large percentage of said stalks are engaged by the slats of the conveyor in the manner shown in Fig. 3 in which it will be noticed that the bent portion B is hooked over the upper edge of the slats. This peculiarity lends itself to an effective separation of the stalk and ear by my improvements whereby the ear may be caused to fall in the chute leading to the husking rolls and the stalk portion discharged.

The ears and stalks therefore approach the presser member in this condition so that the presser member in conjunction with the slats will readily act upon the ears to press them in a position whereby they may be severed from the stems in the following manner: The severing takes place while the ear is retained in the position shown in Fig. 4 and while the slats of the conveyor and the edge 19' of the presser are maintaining for the moment the same approximate speed of movement. The severing is accomplished by a long flat knife 29 of the same approximate length as the cross members of the conveyor, the knife having each end adjustably secured to an angle bracket 31 which are in turn adjustably secured to the members 9. The knife has its sharpened beveled cutting edge turned downwardly, its flat upper surface coinciding with the horizontal legs of the supporting members 10 upon which the chains of the conveyor travel. By this arrangement the lower forward corner of the angle bars 2 make a close shearing engagement with the cutting edge of the knife and effectively sever the ears from their stems, the ear dropping to the chute leading to the husking rolls while the stalk portion is carried upwardly over the upper surface of the knife. During this part of the travel of the conveyor the edge 19' of the presser member releases its engagement with the stalk. The stalk, however, is not permitted to fall until after the curve of the sprocket is passed, as a sheet metal guard 32 is secured to the standard 11 and bent over and under the shaft 6 and secured to an angle bar 33 at the rearward upper edge of the knife, as shown in Fig. 4.

From the foregoing description it will be seen that I have devised a simple, efficient means for preventing undue, additional labor or loss of corn which heretofore accompanied the operation of a corn picking machine. It will also be apparent that ears such as have been described may engage themselves with the bars in the reverse manner as that shown in Figs. 3 and 4, and that while there may not be a clean severing of an ear from its stalk portion, yet the loss of the ear is averted, as the engagement of the sharp cutting edge with the ear acts to remove the ear from the elevator in position for the ear to fall into the proper channel.

Having thus described my invention, I claim:

1. In a corn picking machine, a conveyor for conveying snapped ears from gathering and snapping mechanism, and means near the discharge end of said conveyor for severing ears from ear-ladened stalks carried thereon.

2. In a corn picking machine, a conveyor for snapped ears, and means near the discharge end thereof coacting with said conveyor to sever the ears from ear-ladened stalks carried thereon.

3. In a corn picking machine, a conveyor for snapped ears having spaced cross members, and means near the discharge end thereof coacting with said cross members to sever ears from ear-ladened stalks carried thereon.

4. In a corn picking machine, a conveyor for snapped ears having a pair of endless chains connected by spaced cross members, and means near the discharge end thereof coacting with said cross members to sever ears from ear-ladened stalks carried thereby.

5. In a corn picking machine, a conveyor for snapped ears, said conveyor formed of a pair of chains connected by spaced cross members, a floor beneath said cross members having a discharge edge for the snapped ears, and means beyond said edge of the floor coacting with said cross members to sever ears from ear-ladened stalks carried by the conveyor.

6. In a corn picking machine, a conveyor for conveying snapped ears from gathering and snapping mechanism, a presser member near the discharge end of said conveyor for exerting a pressure on ear-ladened stalks carried by said conveyor, and a knife for severing the ears from said stalks.

7. In a corn picking mechanism, a conveyor for snapped ears, a presser member near the discharge end of the conveyor coacting therewith for exerting a yielding pressure upon ear-ladened stalks carried by said conveyor, and a knife for severing the ears from said stalks.

8. In a corn picking mechanism, a conveyor for snapped ears having spaced cross members, a presser member near the discharge end thereof coacting with said cross members to exert a pressure upon ear-ladened stalks carried by said conveyor, and a knife coacting with said cross members to sever the ears from said stalks.

9. In a corn picking machine, a conveyor for snapped ears having a pair of endless chains connected by spaced cross members, a presser member near the discharge end of said conveyor for coacting with said cross members to exert a pressure upon ear-ladened stalks, and a knife coacting with said cross members to sever the ears from said stalks.

10. In a corn picking machine, a conveyor for snapped ears consisting of a pair of endless chains connected by spaced cross members, supports beneath said chains for supporting the same, a presser member located near the discharge end of said conveyor coacting with said cross members to exert pressure upon ear-ladened stalks, and a knife blade coinciding with said supports to sever the ears from said stalks.

11. In a corn picking machine, a conveyor for snapped ears having a series of spaced cross members, a rotatable presser member near the discharge end of said conveyor arranged to sweep within the spaces between said cross members and coact therewith to press and retain ear-ladened stalks in a position to be severed, and a stationary knife located in the path of the stems of said ears.

12. In a corn picking machine, a conveyor for snapped ears having a series of spaced cross members, a rotatable presser member near the discharge end of said conveyor arranged to sweep within the spaces between said cross members and coact therewith to press and retain ear-ladened stalks in a position to be severed, and a stationary knife located in the path of the stems of said ears, said presser member being of a yieldable character.

13. In a corn picking machine, a conveyor for snapped ears consisting of a pair of endless sprocket chains, sprockets over which said chains pass and spaced cross members connecting said chains, a rotary presser member near the discharge end of said conveyor coacting with said cross members to press and retain ear-ladened stalks in a position for severing the ears from the stems, and a stationary knife located in the path of the stems and coacting with said cross members to sever the ears from the stems.

14. In a corn picking machine, a conveyor for conveying snapped ears consisting of a pair of endless sprocket chains, sprocket wheels over which the chains pass, spaced cross members connecting the chains and supports for the chains on the under side thereof, a rotary presser member arranged to sweep through the space between cross members and coact with said cross members to press and retain ear-ladened stalks in a position to sever the ears from the stalks, and a stationary knife having its cutting edge in line with the upper surface of said supports and coacting with said cross members to sever the ears from the stems.

15. In a corn picking machine, a conveyor for snapped ears having a series of spaced cross members, a rotary presser member near the discharge end of said conveyor coacting with said cross members to press ear-ladened stalks in a position for severing the ears therefrom, said presser member having a circularly-extending rigid portion, and a circularly-extending pivoted yielding portion trailing said rigid portion, and a stationary knife coacting with said cross members to sever the ears from the stems.

In testimony whereof, I have hereunto set my hand this 16th day of June 1930.

ADOLPH J. SYNCK.